United States Patent
Williams et al.

(10) Patent No.: US 10,427,730 B2
(45) Date of Patent: Oct. 1, 2019

(54) ACTIVE SIDE SHIELD

(71) Applicant: Toyota Motor Engineering & Manufacturing North America, Inc., Erlanger, KY (US)

(72) Inventors: Paxton S. Williams, Milan, MI (US); Scott L. Frederick, Brighton, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 15/604,723

(22) Filed: May 25, 2017

(65) Prior Publication Data
US 2018/0339734 A1   Nov. 29, 2018

(51) Int. Cl.
B62D 35/00   (2006.01)
B62D 37/02   (2006.01)

(52) U.S. Cl.
CPC ........... *B62D 35/008* (2013.01); *B62D 37/02* (2013.01)

(58) Field of Classification Search
CPC .................................................. B62D 35/008
USPC .... 296/180.1, 180.2, 26.04, 26.05, 165, 164
See application file for complete search history.

(56) References Cited

U.S. PATENT DOCUMENTS

| | | | |
|---|---|---|---|
| 2,992,038 A * | 7/1961 | Manganello | B62D 33/08 296/36 |
| 3,823,950 A | 7/1974 | Pedersen | |
| 4,441,751 A | 4/1984 | Wesley | |
| 4,472,469 A | 9/1984 | Thies | |
| 4,475,766 A | 10/1984 | McKee | |
| 4,688,841 A | 8/1987 | Moore | |
| 4,982,889 A | 1/1991 | Eardley | |
| 5,018,779 A | 5/1991 | Lund | |
| 5,340,184 A | 8/1994 | Conrado | |
| 5,516,185 A | 5/1996 | O'Donnell et al. | |
| 5,603,510 A | 2/1997 | Sanders | |
| 5,755,483 A | 5/1998 | Lund | |
| 6,079,769 A | 6/2000 | Fannin et al. | |
| 6,502,823 B1 | 1/2003 | Turnquist et al. | |
| 6,617,015 B2 | 9/2003 | Rood | |
| 6,846,035 B2 * | 1/2005 | Wong | B62D 35/001 296/180.1 |

(Continued)

FOREIGN PATENT DOCUMENTS

WO   2010113967 A1   10/2010

*Primary Examiner* — Joseph D. Pape
*Assistant Examiner* — Dana D Ivey
(74) *Attorney, Agent, or Firm* — Christopher G. Darrow; Darrow Mustafa PC

(57) ABSTRACT

A transition region between a first vehicle component and a second vehicle component can be actively managed. In a pick-up truck, the first vehicle component can be a deck and the second vehicle component can be a cabin. A side shield can be movable between a stowed position and a deployed position. In the stowed position, the side shield can be located within the deck. In the deployed position, the side shield can extend at least partially out of the deck in a direction toward the cabin. Responsive to receiving an input indicating the position for the side shield, the side shield can be caused to be moved into or maintained in the indicated position. In some instances, the input can be provided automatically by the vehicle based on a detected vehicle condition, environment condition, and/or other condition. In some instances, the input can be received from a vehicle occupant.

17 Claims, 7 Drawing Sheets

(56) References Cited

U.S. PATENT DOCUMENTS

| | | | |
|---|---|---|---|
| 6,849,310 B2 | 2/2005 | Willett | |
| 7,066,470 B2 | 6/2006 | Turnquist et al. | |
| 7,093,835 B2 | 8/2006 | Addis | |
| 7,380,868 B2 | 6/2008 | Breidenbach | |
| 7,900,982 B2 | 3/2011 | Moore | |
| 8,123,281 B2 * | 2/2012 | Perkins | B62D 35/001 296/180.1 |
| 8,573,682 B2 | 11/2013 | Oomen | |
| 8,801,076 B2 * | 8/2014 | White, Sr. | B62D 35/001 296/180.1 |
| 8,915,538 B2 | 12/2014 | Bland et al. | |
| 9,097,130 B2 | 8/2015 | Willis et al. | |
| 9,243,510 B2 | 1/2016 | Casavant et al. | |
| 9,545,961 B2 | 1/2017 | Breidenbach | |
| 9,637,181 B1 | 5/2017 | Cunningham | |
| 9,688,136 B2 | 6/2017 | Roth et al. | |
| 9,731,776 B1 | 8/2017 | Shen et al. | |
| 2004/0041348 A1 | 3/2004 | Addis | |
| 2004/0100035 A1 | 5/2004 | Turnquist et al. | |
| 2009/0102227 A1 | 4/2009 | Herndon | |
| 2010/0181785 A1 | 7/2010 | Moore | |
| 2011/0198778 A1 | 8/2011 | Bellmore et al. | |
| 2012/0193156 A1 | 8/2012 | Hirano | |
| 2014/0019010 A1 | 1/2014 | Smith et al. | |
| 2014/0069103 A1 | 3/2014 | Willis et al. | |
| 2014/0072418 A1 | 3/2014 | Casavant et al. | |
| 2015/0123310 A1 | 5/2015 | Leonard | |
| 2015/0274010 A1 | 10/2015 | Roth et al. | |
| 2018/0022297 A1 | 1/2018 | Kulkarni et al. | |
| 2018/0339733 A1 | 11/2018 | Frederick et al. | |

* cited by examiner

ACTIVE SIDE SHIELD

FIELD

The subject matter described herein relates in general to vehicles and, more particularly, to the aerodynamic performance of vehicles.

BACKGROUND

Some motor vehicles have storage spaces located behind a passenger seating area. For example, pickup trucks are motor vehicles with a rear open top cargo area, which is commonly referred to as a bed, located behind a passenger cabin. The bed allows the vehicle to be utilized in many different ways, including carrying or storing various types of cargo (e.g., tools, groceries, sporting equipment, etc.).

SUMMARY

In one respect, the subject matter described herein relates to a method of actively managing a transition region between a first vehicle component and a second vehicle component. A side shield can be provided and can be movable between a stowed position and a deployed position. When in the stowed position, the side shield can be located within the first vehicle component. When in the deployed position, the side shield can extend at least partially out of the first vehicle component in a direction toward the second vehicle component. In this way, the shape of transition region between the first vehicle component and the second vehicle component can be altered to provide favorable aerodynamic performance characteristics. The method can include receiving an input indicating a position for the side shield. The indicated position can be the stowed position or the deployed position. The method can include causing the side shield to be moved into or maintained in the position indicated in the input.

In another respect, the subject matter described herein relates to a system for actively managing a transition region between vehicle components. The system can include a first vehicle component and a second vehicle component. The second vehicle component can be located proximate the first vehicle component. The system can include a side shield. The side shield can be located at least partially within the first vehicle component. The side shield can be movable between a stowed position and a deployed position. When in the stowed position, the side shield can be located within the first vehicle component. When in the deployed position, the side shield can extend at least partially out of the first vehicle component in a direction toward the second vehicle component. Thus, the shape of the transition region between the first vehicle component and the second vehicle component can be altered to provide favorable aerodynamic performance characteristics.

DETAILED DESCRIPTION

Figure 1:
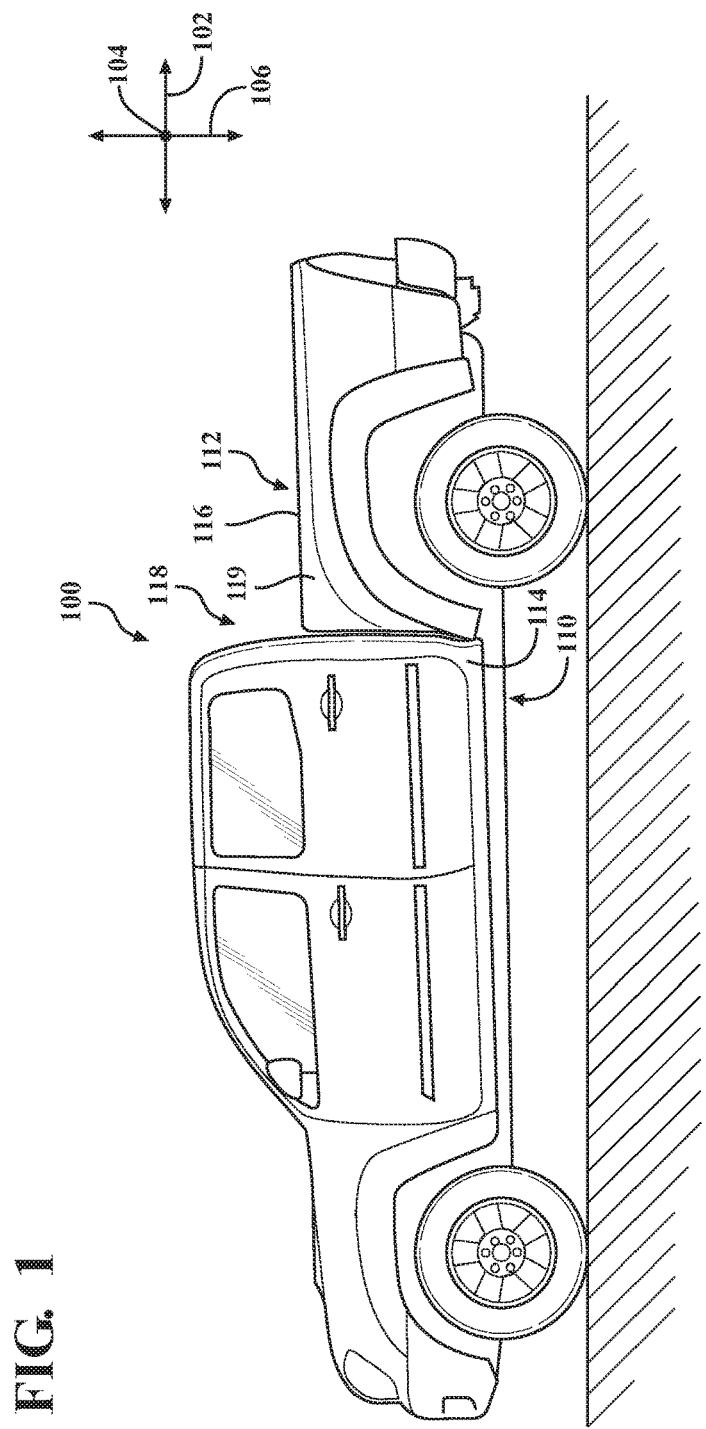
FIG. 1 is an example of a pick-up truck.

In a pick-up truck, the region in which the cabin transitions to the deck results in a relatively large change in shape. This drastic transition can cause a significant amount of air drag. As a result, the aerodynamic performance of the vehicle can be reduced, which, in turn, can negatively affect fuel economy. This detailed description relates to actively managing the shape of the transition between the cabin and the deck. A movable side shield can be used for such purposes. The side shield can be selectively moved between a stowed position and a deployed position. When in the deployed position, the side shield can improve vehicle aerodynamics and fuel efficiency.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-8, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

FIG. 1 shows an example of a vehicle 100. As used herein, "vehicle" means any form of motorized transport. In one or more implementations, the vehicle 100 can be a pick-up truck or a sport utility vehicle. While arrangements will be described herein with respect to a pick-up truck, it will be understood that embodiments are not limited to pick-up trucks.

The vehicle 100 can have an associated longitudinal direction 102. The longitudinal direction 102 can generally extend in the forward-aft direction of the vehicle 100. The vehicle 100 can have an associated lateral direction 104, which can be substantially perpendicular to the longitudinal direction 102. As used herein, the term "substantially" includes exactly the term it modifies and slight variations therefrom (e.g., within normal manufacturing tolerances, within about 10 percent (or degrees or other units) or less, within about 5 percent or less, within about 4 percent s or less, within about 3 percent or less, within about 2 percent or less, or within about 1 percent or less). The lateral direction 104 can generally extend in the left-right direction of the vehicle 100 (i.e., into and out of the page in FIG. 1). The vehicle 100 can have an associated elevational direction 106. The elevational direction 106 can generally extend in the top-bottom direction of the vehicle 100.

The vehicle 100 can include a first vehicle component 110 and a second vehicle component 112. The first vehicle component 110 and the second vehicle component 112 can be any suitable vehicle components. For example, the first vehicle component 110 and the second vehicle component 112 can be located on and/or can define at least in part an exterior of the vehicle 100. In one or more arrangements, the first vehicle component 110 and the second vehicle component 112 can be substantially proximate to each other.

In one or more arrangements, the first vehicle component 110 can be a cabin 114. The cabin 114 can be a compartment or seating area for passengers. The cabin 114 can be defined by one or more components. In one or more arrangements, the second vehicle component 112 can be a deck 116 (which can also be referred to as a bed). The deck 116 can be an open top cargo area. The deck 116 can allow the vehicle 100 to be utilized in many different ways, including carrying or storing various types of cargo (e.g., tools, groceries, sporting equipment, etc.). The deck 116 can be open topped. In some instances, the open top of the deck 116 can be closed by a tonneau cover or other element. The deck 116 can be defined by one or more components, such as a side wall 119.

The cabin 114 can transition to the deck 116 in a transition region 118. In the transition region 118, there can be a relatively large change in shape between the cabin 114 and the deck 116 (or between the first vehicle component 110 and the second vehicle component 112). The cabin 114 can be a relatively high, generally closed structure. In contrast, the deck 116 can be a relatively short, open-topped structure.

Figure 2:
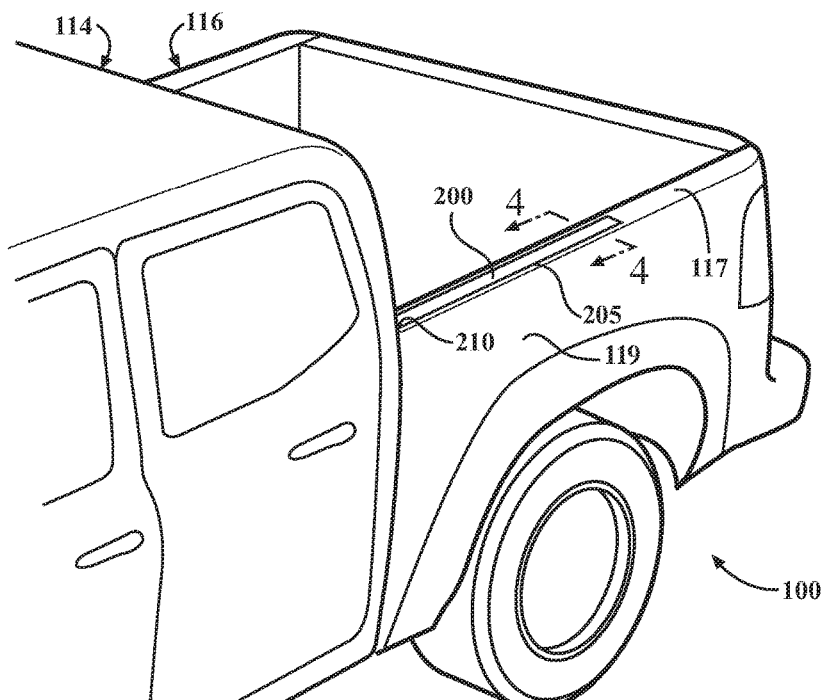
FIG. 2 is an example of a transition between the cabin and the deck of the pick-up truck, wherein a side shield is in a stowed position.
Figure 3:
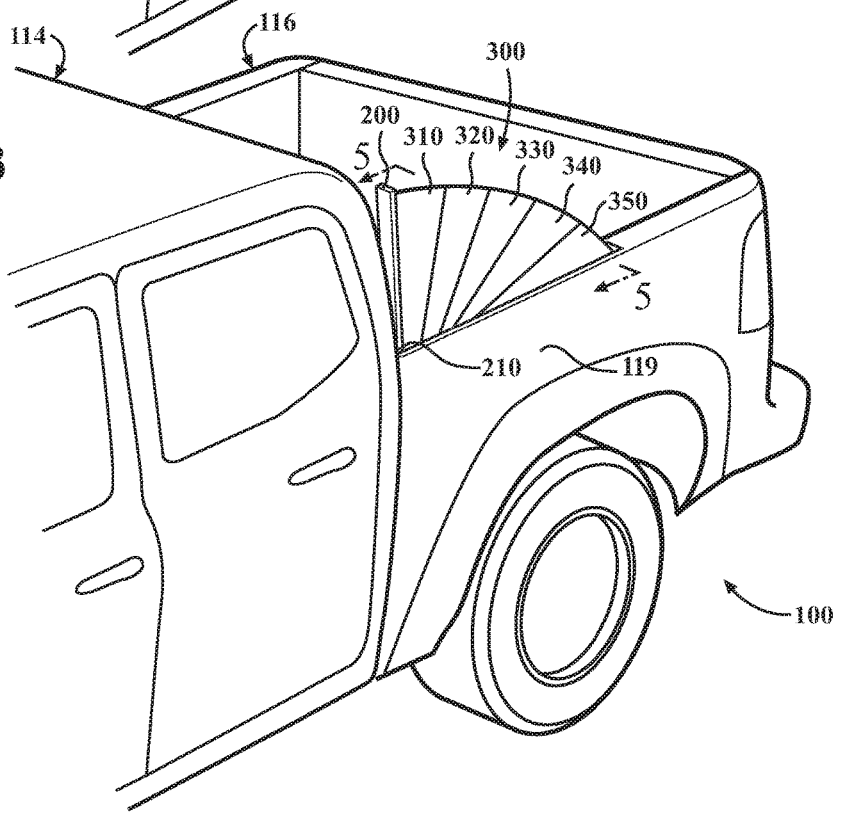
FIG. 3 is an example of the transition between the cabin and the deck of the pick-up truck, wherein the side shield is in a deployed position.

According to arrangements herein, the aerodynamics of the vehicle 100 at the transition region 118 can be actively managed. For instance, the vehicle 100 can include a side shield 300. The side shield 300 can be movable between a stowed position and a deployed position. FIGS. 2 and 3 show the side shield 300 in the stowed positon and the deployed position, respectively. In the stowed positon, the side shield 300 can be located within the deck 116 or the cabin 114. For instance, the side shield 300 can be located within a hollow cavity 400 (FIG. 4) within the side wall 119 of the deck 116. In such case, the side shield 300 may not be visible from outside the vehicle 100.

In the deployed position, the side shield 300 can provide for a smoother, more gradual change in shape between the cabin 114 and the deck 116. In the deployed position, at least a portion of the side shield 300 can extend out of the deck 116 and can extend generally toward the cabin 114. In the deployed position, a majority of the side shield 300 can be located outside of the respective vehicle component in which it is housed (e.g., the deck 116 in FIG. 3). In the deployed position, the side shield 300 can be in line with a respective side of the deck 116, but the side shield 300 does not cover the open top of the deck 116. In the deployed position, the side shield 300 can extend in a substantially vertical direction. In the deployed position, the side shield 300 can extend to substantially the same height of the cabin 114 or a substantial majority of the height difference between the cabin 114 and the deck 116.

In some instances, the deployed position can correspond to a maximum extended position of the side shield 300. In one or more arrangements, when in the maximum extended position, the side shield 300 can contact the cabin 114. Alternatively, when in the maximum extended position, the side shield 300 can be spaced from the cabin 114. In such case, any suitable spacing can be provided. In one or more arrangements, the side shield 300 can have one or more intermediate positions between the stowed positon and the deployed position. In such intermediate positions, at least a portion of the side shield 300 can extend outside of the deck 116 and can extend generally toward the cabin 114, but the side shield 300 is not in a maximum extended position.

It will be appreciated that, while FIGS. 2 and 3 show the side shield 300 as being located within the deck 116, the side shield 300 can alternatively be located within the cabin 114. The deck 116 can include an aperture 205 through which the side shield 300 can pass as the side shield 300 is moved into and out of the stowed position and/or the deployed position. Similarly, the cabin 114 can include an aperture if the side shield 300 is located within the cabin 114. The aperture 205 can be formed in any suitable manner, such as by stamping, punching, or cutting. The aperture 205 can have any suitable size, shape, and/or configuration to allow for unimpeded passage of the side shield 300 therethrough while it is being moved into and out of the vehicle component in which it is housed. In one or more arrangements, the aperture 205 can be substantially rectangular.

In some instances, the aperture 205 can be sealed to keep the interior of the respective vehicle component dry and/or to prevent the infiltration of dirt or other unwanted substances. For example, if the side shield 300 is located in the cabin 114, the aperture 205 can be sealed. Any suitable type of sealing system or elements, now known or later developed, can be used. If the side shield 300 is located in the deck 116, the aperture 205 may or may not be sealed.

The aperture 205 can be closable by a closure element, such as a cover 200. The cover 200 can have any suitable size, shape, and/or configuration. The cover 200 can be operatively connected to the deck 116 in any suitable manner. The term "operatively connected," as used throughout this description, can include direct or indirect connections, including connections without direct physical contact. In one or more arrangements, the cover 200 can be movably connected to the deck 116. As an example, the cover 200 can be connected to the deck 116 so as to allow the cover 200 to rotate or pivot relative thereto. Such motion of the cover 200 can be achieved by, for example, one or more hinges 210.

Figure 4:
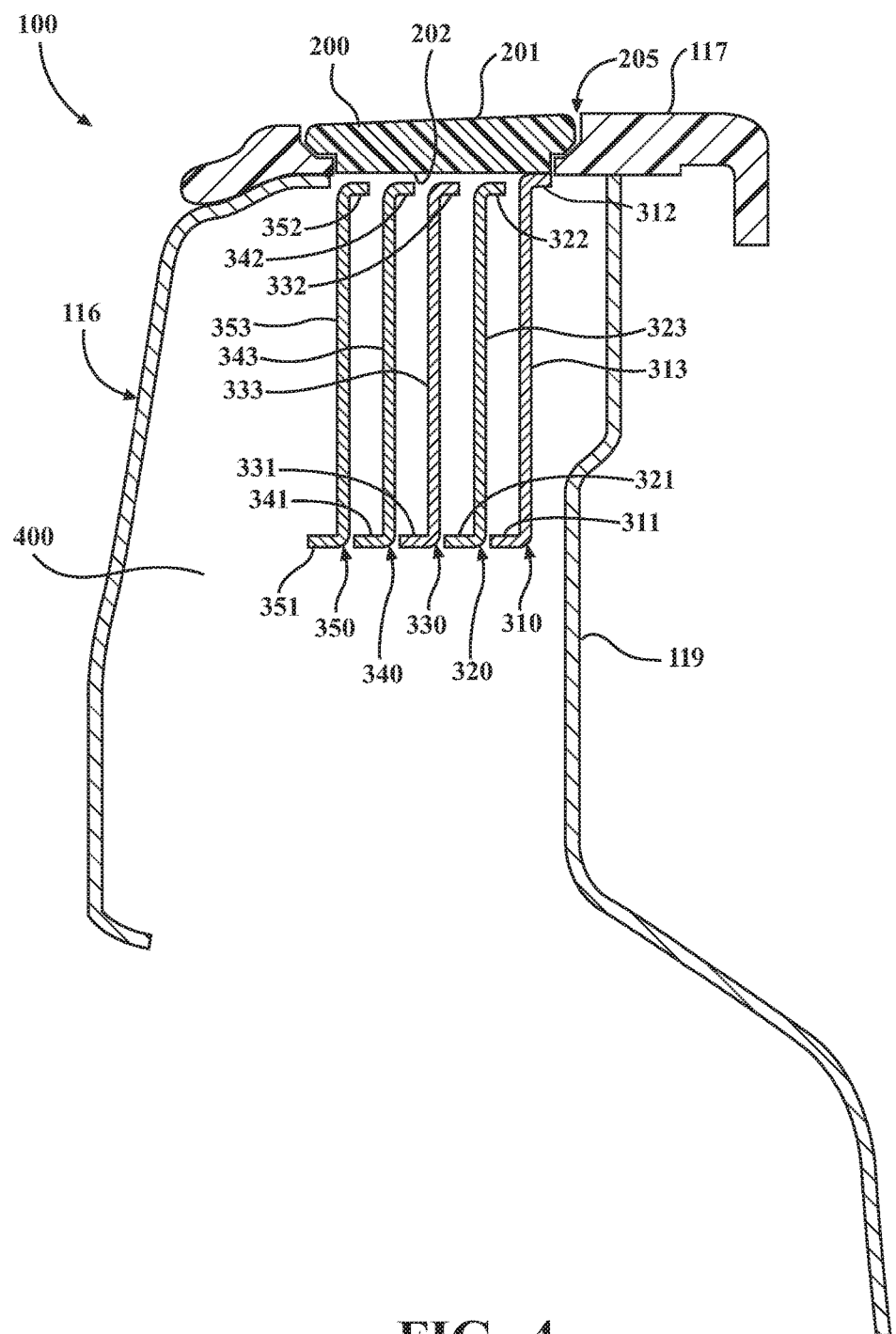
FIG. 4 is a cross-sectional view, viewed along line 4-4 in FIG. 2, showing the side shield in the stowed position.

When the side shield 300 is in the stowed position, a top surface 201 of the cover 200 can be substantially flush with a top surface 117 of the deck 116, as is shown in FIG. 4. In one or more arrangements, the cover 200 can sealingly engage the deck 116 when the side shield 300 is in the stowed position. As shown in FIG. 4, the cover 200 can be supported on a portion of the deck 116.

Further, while the side shield 300 is shown in FIGS. 2 and 3 as being used on one side of the vehicle 100, it will be appreciated that, alternatively or in addition, the side shield 300 can be used on the other side of the vehicle 100. Thus, the description of the side shield 300 herein is applicable to both sides of the vehicle 100. When used on both sides of the vehicle 100, the side shields 300 can be operated independently of each other, or they can be operated in a coordinated manner.

Figure 5:
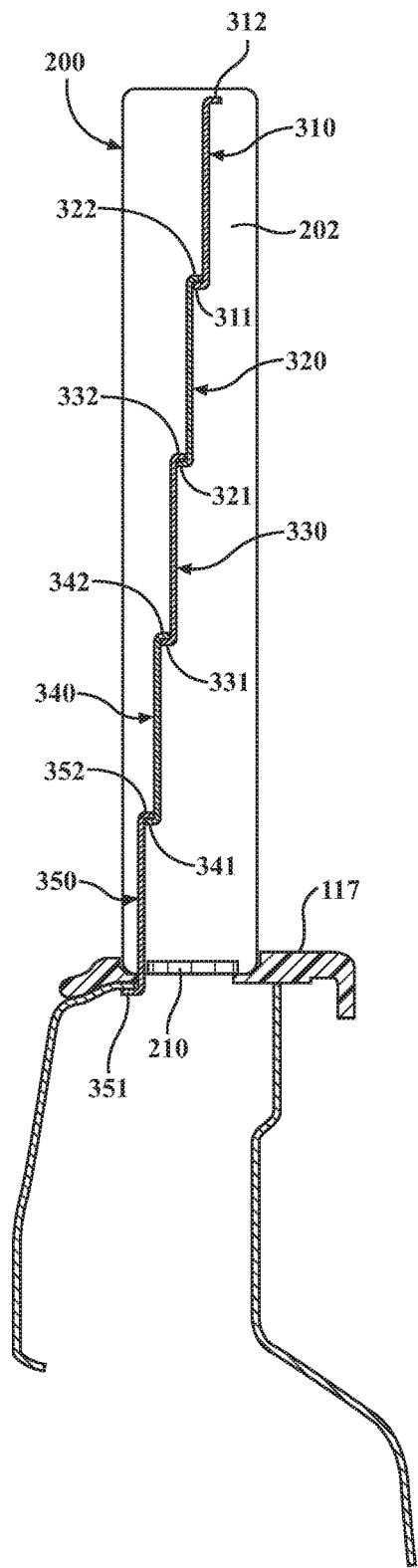
FIG. 5 is a cross-sectional view, viewed along line 5-5 in FIG. 3, showing the side shield in the deployed position.
Figure 6:
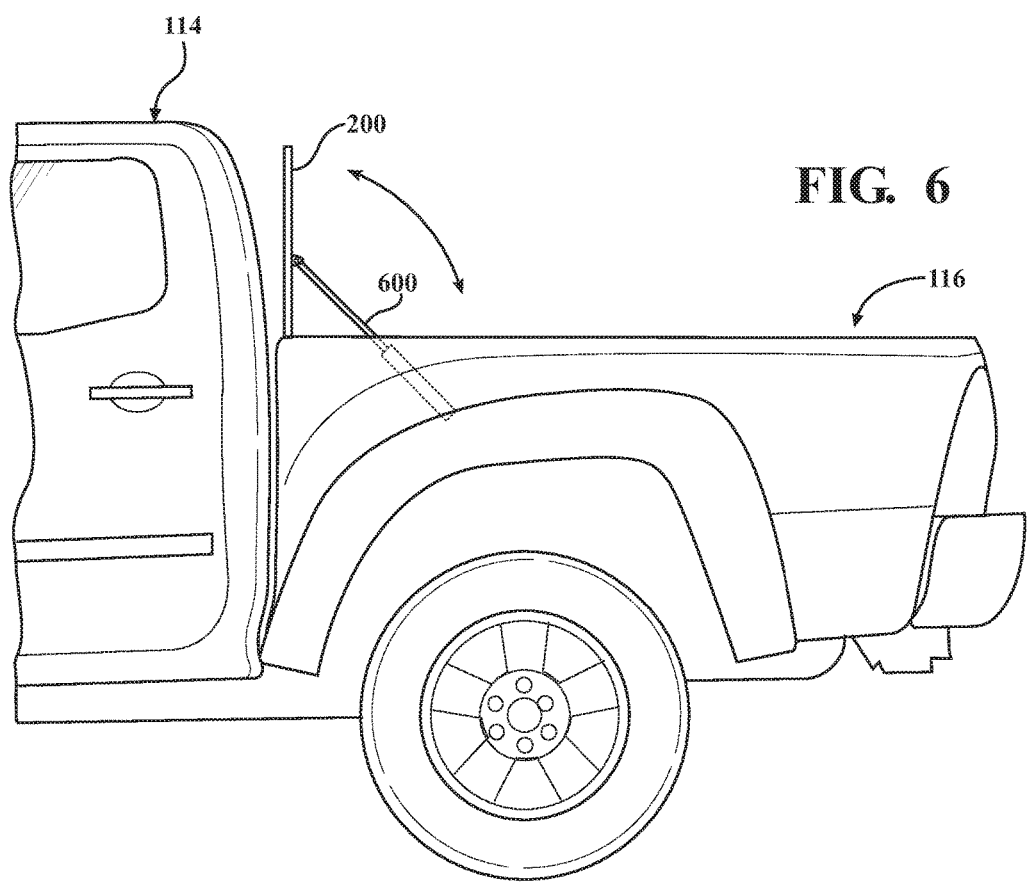
FIG. 6 is a view of the transition between the cabin and the deck of the pick-up truck, showing a cover being moved into the deployed position by an actuator.

The side shield 300 can have any suitable form. FIGS. 3-5 show one example of the side shield 300. The side shield 300 can include a shield body. The shield body can have any suitable configuration. In one or more arrangements, the shield body can have a substantially quarter round configuration at least when in the deployed position, as is shown in FIG. 3. A quarter round can include shapes that are quarter circular, quarter oval, or quarter polygonal. However, it will be understood that the shield body can have any suitable shape in the deployed position, such as substantially triangular or substantially trapezoidal, just to name a few possibilities.

In one or more arrangements, the shield body can be made of a single piece. In one or more arrangements, the shield body can be made of a plurality of shield body segments. One example of such a configuration is shown in FIGS. 3-5. There can be any number of shield body segments. While arrangements shown and described herein are made with respect to a shield body with five shield body segments, it will be understood that the shield body is not to any particular quantity of shield body segments. Indeed, the shield body can have more or fewer shield body segments.

In the example shown in FIGS. 3-5, the shield body can include a first shield body segment 310, a second shield body segment 320 a third shield body segment 330, a fourth shield body segment 340, and a fifth shield body segment 350. The shield body segments 310, 320, 330, 340, 350 can have any suitable configuration. The shield body segments 310, 320, 330, 340, 350 can be substantially identical to each other, or one or more of the shield body segments 310, 320, 330, 340, 350 can be different from the other shield body segments 310, 320, 330, 340, 350. In the configuration shown in FIGS. 4-5, the shield body segments 310, 320, 330, 340, 350 can be relatively thin walled bodies. The shield body segments 310, 320, 330, 340, 350 can have a main body portion 313, 323, 333, 343, 353, respectively. In one or more arrangements, the main body portions 313, 323, 333, 343, 353 can be substantially straight. However, the main body portions 313, 323, 333, 343, 353 can have any suitable configuration, including one or more not straight portions.

The shield body segments 310, 320, 330, 340, 350 can be configured for interlocking engagement with each other. Such interlocking engagement can be achieved in any suitable manner. For instance, at a first end of the main body portions 313, 323, 333, 343, 353, there can be a first flange 311, 321, 331, 341, 351, respectively. At a second send of the main body portions 313, 323, 333, 343, 353, there can be a second flange 312, 322, 332, 342, 352, respectively. The first and second flanges can extend substantially perpendicular to the main bodies. The first flange and the second flange of each main body can be substantially parallel to each other. In one or more arrangements, the first flange and the second flange of each shield body segment 310, 320, 330, 340, 350 can extend in opposite directions from the respective main body portion 313, 323, 333, 343, 353, as is shown in FIG. 4.

It should be noted that in the stowed position, the shield body segments 310, 320, 330, 340, 350 can be located within the deck 116 in any suitable manner, such as within the side wall 119. In one or more arrangements, the shield body segments 310, 320, 330, 340, 350 can be located in a compact, neighboring arrangement, as is shown in FIG. 4.

One of the shield body segments 310, 320, 330, 340, 350 can be operatively connected to the cover 200. For instance, as is shown in FIG. 4, the second flange 312 of the first shield body segment 310 can be connected to an under side 202 of the cover 200 in any suitable manner, such as welding, brazing, adhesives, one or more fasteners, and/or one or more forms of mechanical engagement, just to name a few possibilities.

In moving from the stowed position to the deployed position, the cover 200 can be rotatable about the one or more hinges 210. In one or more arrangements, the shield body segments can be configured for interlocking engagement with one or more neighboring shield body segments. As the cover 200 rotates toward the deployed position, the first shield body segment 310 can be pulled along with it due to the operative connection between them. Eventually, the first flange 311 of the first shield body segment 310 can operatively engage the second flange 322 of the second shield body segment 320. Due to this operative engagement, the second shield body segment 320 can be caught and pulled outward by the first shield body segment 310 as the cover 200 continues to be moved toward the deployed position. Eventually, the first flange 321 of the second shield body segment 320 can operatively engage the second flange 332 of the third shield body segment 330. The process can continue until the deployed position is reached. An example of the deployed position is shown in FIG. 5. It should be noted that the last shield body segment to be deployed (e.g., the fifth shield body segment 350) can be configured to at least partially limit the movement of the side shield 300. For instance, the first flange 351 of the fifth shield body segment 350 can operatively engage a portion of the deck 116, as is shown in FIG. 5. When the side shield 300 is in the deployed position, the shield body segments can, in one or more examples, be arranged in a fan-like array.

The side shield 300 and/or the cover 200 can have any suitable range of motion in moving between the stowed position and the deployed position. For instance, the side shield 300 and/or the cover 200 can have a range of motion of about 80 degrees to about 100 degrees. As another example, the side shield 300 and/or the cover 200 can have a range of motion of about 85 degrees to about 95 degrees. In one or more arrangements, the side shield 300 and/or the cover 200 can have a range of motion of substantially 90 degrees.

When in the deployed position, the side shield 300 and/or the cover 200 can be located substantially adjacent to the cabin 114. In one or more arrangements, the side shield 300 and/or the cover 200 can directly contact at least a portion of the cabin 114. In one or more arrangements, the side shield 300 and/or the cover 200 can be spaced from the cabin 114. In the deployed position, the side shield 300 and/or the cover 200 can have substantially the same height as the cabin 114. The side shield 300 can extend any suitable length along the deck 116. The length of the side shield 300 can be dependent upon one or more factors, such as, for example, the length of the deck 116, the shape of the cabin 114, and/or one or more other factors.

It should be noted that the shield body segments 310, 320, 330, 340, 350 can move along with the cover 200 in a rotational manner. Thus, the shield body segments 310, 320, 330, 340, 350 can be rotatable about an axis of rotation. In one or more arrangements, the shield body segments 310, 320, 330, 340, 350 can have a common axis of rotation. Thus, the shield body segments 310, 320, 330, 340, 350 can be selectively moved between the stowed and deployed positions in a rotatable manner. In one or more arrangements, the axis of rotation of the shield body segments 310, 320, 330, 340, 350 can be substantially the same as the axis of rotation of the hinge(s) 210.

Of course, it will be appreciated that the side shield 300 can be moved from the deployed condition to the stowed condition. In such case, the cover 200 can be pulled to the stowed position. As a result, the cover 200 can pull the side shield 300 with it. For instance, the cover 200 can pull the first shield body segment 310 due to their operative connection. In some arrangements, the shield body segments 310, 320, 330, 340, 350 can be configured so that they interlockingly engage with each other when going into the stowed position. In some arrangements, the shield body segments 310, 320, 330, 340, 350 can be configured so that they sequentially disengage from each other when returning to the stowed position. In some arrangements, as the first shield body segment 310 is pulled toward the stowed position by the cover 200, the first flange 311 of the first shield body segment 310 can disengage from the second flange 322 of the second shield body segment 320. As such, the second shield body segment 310 can move toward the stowed position due to gravity or to some other force acting upon the second shield body segment 310. The process can continue until all of the shield body segments 310, 320, 330, 340, 350 are in the stowed position.

The shield body can be made out of any suitable material. In one or more arrangements, the shield body can be made of any suitable resin. In one or more arrangements, the shield body can be made of metal or plastic. In one or more arrangements, the shield body can be made of a substantially transparent or a translucent material. A shield body that is substantially transparent or translucent can be beneficial because it can minimize blocking a driver's view when in the deployed position. In one or more arrangements, the shield body segments can be painted or otherwise provided in a color that substantially matches the exterior paint color of the vehicle 100.

The side shield 300 can be moved between the stowed position and the deployed condition in any suitable manner. As an example, there can be one or more actuators 770 (FIG. 7), one or more pistons 600 (FIG. 6), one or more push bars, one or more pull bars, one or more motors, one or more pulleys, and/or one or more magnets operatively connected to cause the side shield 300 to move into the stowed position and/or the deployed position. The actuator(s), piston(s), push bar(s), pull bar(s), motor(s) pulley(s), and/or magnet(s) can be selectively activated to cause the side shield 300 to be moved into and out of the stowed position and/or the deployed position. The one or more actuators 770 can include pneumatic actuators, hydraulic pistons, relays, solenoids, and/or piezoelectric actuators, just to name a few possibilities. The actuator(s), piston(s), push bar(s), pull bar(s), motor(s), pulley(s), and/or magnet(s) can be activated responsive to receiving signals or other inputs from one or more vehicle sources. In one or more arrangements, actuator(s), piston(s), push bar(s), pull bar(s), motor(s) pulley(s), and/or magnet(s) can be operatively connected to the cover 200 and/or the side shield 300. In the arrangement shown in FIG. 6 (the side shield 300 is not shown for clarity), a piston 600 is operatively connected to the cover 200.

In one or more arrangements, the one or more actuator(s) 770 can be configured to extend and/or contract in a linear manner. In some instances, the one or more actuator(s) 770 can move in one or more non-linear manners (e.g., rotational). In some instances, the one or more actuator(s) 770 can move in a combination of directions and/or using a combination of types of motion.

Figure 7:
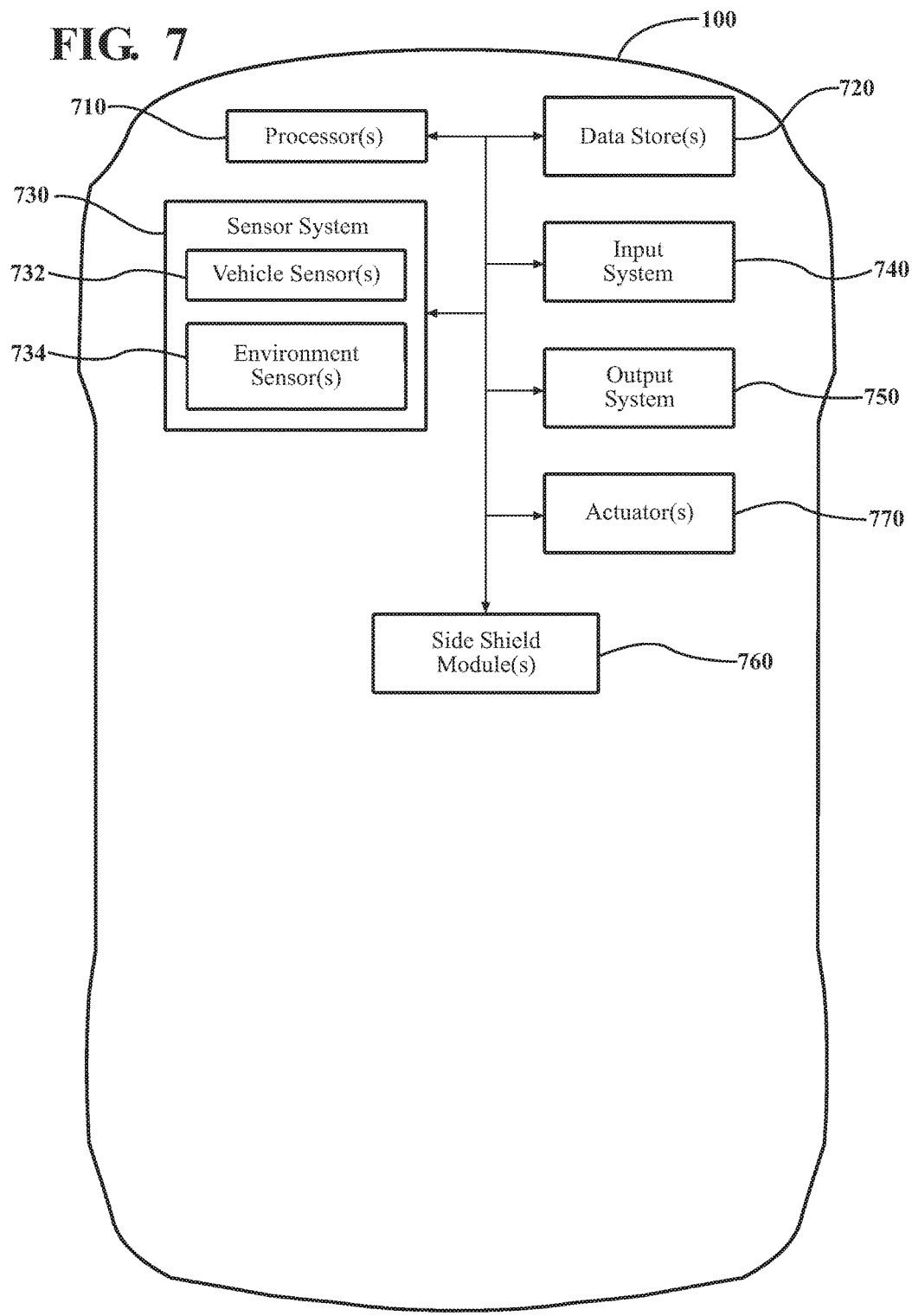
FIG. 7 shows examples of additional elements of the pick-up truck.

The vehicle 100 can include various elements that at least partially relate to the side shield 300. Some of the possible elements of the vehicle 100 are shown in FIG. 7 and will now be described. It will be understood that it is not necessary for the vehicle 100 to have all of the elements shown in FIG. 7 or described herein. The vehicle 100 can have any combination of the various elements shown in FIG. 7. Further, the vehicle 100 can have additional elements to those shown in FIG. 7. In some arrangements, the vehicle 100 may not include one or more of the elements shown in FIG. 7. Further, while the various elements are shown as being located within the vehicle 100 in FIG. 7, it will be understood that one or more of these elements can be located external to the vehicle 100. Further, the elements shown may be physically separated by large distances.

The various elements can be communicatively linked through one or more communication networks. As used herein, the term "communicatively linked" can include direct or indirect connections through a communication channel or pathway or another component or system. A "communication network" means one or more components designed to transmit and/or receive information from one source to another. One or more of the elements of the vehicle 100 can include and/or execute suitable communication software, which enables the various elements to communicate with each other through the communication network and perform the functions disclosed herein.

The one or more communication networks can be implemented as, or include, without limitation, a wide area network (WAN), a local area network (LAN), the Public Switched Telephone Network (PSTN), a wireless network, a mobile network, a Virtual Private Network (VPN), the Internet, and/or one or more intranets. The communication network further can be implemented as or include one or more wireless networks, whether short range (e.g., a local wireless network built using a Bluetooth or one of the IEEE 802 wireless communication protocols, e.g., 802.11a/b/g/i, 802.15, 802.16, 802.20, Wi-Fi Protected Access (WPA), or WPA2) or long range (e.g., a mobile, cellular, and or satellite-based wireless network, GSM, TDMA, CDMA, WCDMA networks or the like). The communication network can include wired communication links and/or wireless communication links. The communication network can include any combination of the above networks and/or other types of networks.

The vehicle 100 can include one or more processors 710. "Processor" means any component or group of components that are configured to execute any of the processes described herein or any form of instructions to carry out such processes or cause such processes to be performed. The processor(s) 710 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor(s) 710 can include at least one hardware circuit (e.g., an integrated circuit) configured to carry out instructions contained in program code. In arrangements in which there is a plurality of processors 710, such processors can work independently from each other or one or more processors can work in combination with each other. In one or more arrangements, the processor(s) 710 can be a main processor of the vehicle 100.

The vehicle 100 can include one or more data stores 720 for storing one or more types of data. The data store(s) 720 can include volatile and/or non-volatile memory. Examples of suitable data stores 720 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 720 can be a component of the processor(s)

710, or the data store(s) 720 can be operatively connected to the processor(s) 710 for use thereby.

As noted above, the vehicle 100 can include the sensor system 730. The sensor system 730 can include one or more sensors. "Sensor" means any device, component and/or system that can detect, determine, assess, monitor, measure, quantify and/or sense something. The one or more sensors can detect, determine, assess, monitor, measure, quantify and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 730 includes a plurality of sensors, the sensors can work independently from each other. Alternatively, two or more of the sensors can work in combination with each other. In such case, the two or more sensors can form a sensor network. The sensor system 730 and/or the one or more sensors can be operatively connected to the processor(s) 710, the data store(s) 720, and/or other element of the vehicle 100 (including any of the elements shown in FIG. 7).

The sensor system 730 can include any suitable type of sensor. For instance, the sensor system 730 can include one or more vehicle sensors 732, which can be configured to acquire, detect, determine, assess, monitor, measure, quantify and/or sense information about the vehicle 100 itself (e.g., position, location, orientation, speed, acceleration, deceleration, accelerator pedal position, brake pedal position, etc.). In one or more arrangements, the vehicle sensor(s) 732 can include a speedometer. In one or more arrangements, the vehicle sensor(s) 732 can include one or more sensors (e.g., proximity sensor(s), infrared sensor(s), etc.) to detect movement or relative movement of one or more vehicle components. For instance, one or more of such sensors could be provided on one of the first vehicle component 110 or the second vehicle component 112, and such sensor(s) can detect relative movement of the other one of the first vehicle component 110 or the second vehicle component 112.

Alternatively or in addition, the sensor system 730 can include one or more environment sensors 734, which can be configured to acquire, detect, determine, assess, monitor, measure, quantify and/or sense data or information about the external environment in which a vehicle is located or one or more portions thereof. For example, such data or information can include wind speed, road conditions, etc. In one or more arrangements, the environment sensor(s) 734 can include an air/wind speed sensor.

The vehicle 100 can include an input system 740. An "input system" includes any device, component, system, element or arrangement or groups thereof that enable information/data to be entered into a machine. The input system 740 can be configured to receive an input from a vehicle occupant (e.g. a driver or a passenger). The input system 740 can include one or more input elements, such as buttons, switches, dials, keys, touch screens, microphones, just to name a few possibilities. etc.

The vehicle 100 can include an output system 750. An "output system" includes any device, component, system, element or arrangement or groups thereof that enable information/data to be presented to a vehicle occupant (e.g. a person, a vehicle occupant, etc.). The output system 750 can be configured to present information/data to a vehicle occupant. Some components of the vehicle 100 may serve as both a component of the input system 740 and a component of the output system 750.

The vehicle 100 can include one or more modules. The modules can be implemented as computer readable program code that, when executed by a processor, implement one or more of the various processes described herein. One or more of the modules can be a component of the processor(s) 710, or one or more of the modules can be executed on and/or distributed among other processing systems to which the processor(s) 710 is operatively connected. The modules can include instructions (e.g., program logic) executable by one or more processor(s) 710. Alternatively or in addition, one or more data store 720 may contain such instructions. The modules described herein can include artificial or computational intelligence elements, e.g., neural network, fuzzy logic or other machine learning algorithms.

The vehicle 100 can include one or more side shield position modules 760. The side shield position module(s) 760 can be configured to perform various functions. The side shield position module(s) 760 can be configured to receive and/or acquire data relating to conditions, parameters, and/or factors that may affect the aerodynamics of the vehicle 100 relative to the transition region 118 between the cabin 114 and the deck 116. The side shield position module(s) 760 can receive and/or acquire data from the sensor system 730, the data store(s) 720, and/or any other source of information relating to the vehicle 100 and/or the external environment of the vehicle 100. The side shield position module(s) 760 can use such information to determine a suitable position for the side shield 300.

The side shield position module(s) 760 can be configured to cause, directly or indirectly, the movement of the side shield 300 to a desired position. As used herein, "cause" or "causing" means to make, force, compel, direct, command, instruct, and/or enable an event or action to occur or at least be in a state where such event or action may occur, either in a direct or indirect manner. The side shield position module(s) 760 can be configured to execute various vehicle functions and/or to transmit data to, receive data from, interact with, and/or control the vehicle 100 or one or more systems or components thereof (e.g. motor(s), actuator(s), piston(s), etc.).

In one or more arrangements, the side shield position module(s) 760 can be configured to cause the movement of the side shield 300 based at least in part on a detected condition or state of the vehicle 100, a detected condition or state of the external environment of the vehicle 100, and/or other factor(s). Such conditions or factors can be assessed relative to a side shield stowage threshold. In one or more arrangements, the causing of the movement of the side shield 300 can be performed automatically by the side shield position module(s) 760 and/or the processor(s) 710. In one or more arrangements, a vehicle occupant can be prompted for approval to cause the movement of the side shield 300. The side shield position module(s) 760 can determine a suitable position for the side shield 300 based on data obtained by one or more sensors of the sensor system 730. Various examples will now be described.

In one or more arrangements, the position of the side shield 300 can be based at least partially on the current speed of the vehicle 100. In some arrangements, the side shield 300 can be moved into or remain in the deployed position when the vehicle 100 is traveling at low speeds, and the side shield 300 can be moved into or remain in the stowed position when the vehicle 100 is traveling at high speeds. The current speed of the vehicle 100 can be determined in any suitable manner, now know or later developed. For instance, the current speed of the vehicle 100 can be determined by a speedometer or other speed sensor. The current speed of the vehicle 100 can be determined continuously, periodically, irregularly, or even randomly. In other arrangements, the side shield 300 can be moved into or remain in the deployed position when the vehicle 100 is traveling at high speeds, and the side shield 300 can be moved into or remain in the stowed position when the vehicle 100 is traveling at low speeds.

The side shield position module(s) 760 and/or the processor(s) can assess the current speed relative to a side shield stowage threshold, which can be a speed threshold. Any suitable speed threshold can be used to determine whether the vehicle 100 is traveling at a low speed or a high speed. For instance, the threshold speed can be about 45 miles per hour, about 50 miles per hour, about 55 miles per hour, or about 60 miles per hour, just to name a few possibilities. If the current speed of the vehicle 100 is above the threshold speed, then the vehicle 100 is determined to be traveling at a high speed. If the current speed of the vehicle 100 is below the threshold speed, then the vehicle 100 is determined to be traveling at a low speed. If the current speed of the vehicle 100 is equal to the threshold speed, then the vehicle 100 can be determined to be traveling at either a high speed or a low speed. The determination of whether the current speed of the vehicle 100 is a high speed or a low speed can be determined continuously, periodically, irregularly, or even randomly.

In one or more arrangements, the position of the side shield 300 can be based at least partially on the air/wind speed in the external environment of the vehicle 100. In some arrangements, the side shield 300 can be moved into or remain in the deployed position when low wind speeds are detected, and the side shield 300 can be moved into or remain in the stowed position when high wind speeds are detected. Any suitable threshold speed can be used to determine whether the air speed is high or low. The air/wind speed can be determined in any suitable manner, now know or later developed. For instance, the air/wind speed can be determined by an air/wind speed sensor, which can be provided in any suitable location on the vehicle 100. The air/wind speed can be determined continuously, periodically, irregularly, or even randomly. In other arrangements, the side shield 300 can be moved into or remain in the deployed position when high wind speeds are detected, and the side shield 300 can be moved into or remain in the stowed position when low wind speeds are detected.

The side shield position module(s) 760 and/or the processor(s) can assess the current air/wind speed to a side shield stowage threshold, which can be an air/wind speed threshold. Any suitable air/wind speed threshold can be used. If the current air/wind speed is above the air/wind speed threshold, then it can be determined that high air/wind speeds are present. If the current air/wind speed is below the air/wind speed threshold, then it can be determined that low air/wind speeds are present. If the current air/wind speed is equal to the air/wind speed threshold, then it can be determined either that the air/wind speeds are either high or low. The determination of whether the current air/wind speeds are high or low can be determined continuously, periodically, irregularly, or even randomly.

In one or more arrangements, the movement of the side shield 300 into and/or out of the stowed position and/or the deployed position can be in response to a manual input received from a vehicle occupant. A vehicle occupant may wish for the side shield 300 to be in a particular position. Accordingly, the vehicle occupant can indicate that the side shield 300 should be moved to or remain in the desired position. The vehicle occupant can provide a command using the input system 740 of the vehicle 100. In one or more arrangements, the movement of the side shield 300 into and/or out of the stowed and/or deployed positions can be performed automatically by the vehicle 100. In such instances, the command from the vehicle occupant can act as an override of any automatic movements of the side shield 300. In one or more arrangements, the movement of the side shield 300 into and/or out of the stowed position and/or the deployed position can be made in response to only manual inputs.

When the vehicle 100 is not in use (e.g., the engine is turned off) and/or when a transmission of the vehicle 100 is in park, the side shield 300 can be in the stowed position. When such conditions are detected, the side shield 300 can be caused to be moved to the stowed position or can remain in the stowed position. Thus, the side shield 300 would not be visible from outside of the vehicle 100. When the vehicle 100 is in use but is not moving (e.g., stopped at a traffic signal or in traffic), the side shield 300 can be caused to be moved to the deployed position or can remain in the deployed position. In one or more arrangements, the side shield 300 can be caused to be moved to the deployed position at vehicle start-up.

Now that the various potential systems, devices, elements and/or components of the vehicle 100 have been described, various methods will now be described. Various possible steps of such methods will now be described. The methods described may be applicable to the arrangements described above in relation to FIGS. 1-7, but it is understood that the methods can be carried out with other suitable systems and arrangements. Moreover, the methods may include other steps that are not shown here, and in fact, the methods are not limited to including every step shown. The blocks that are illustrated here as part of the methods are not limited to the particular chronological order. Indeed, some of the blocks may be performed in a different order than what is shown and/or at least some of the blocks shown can occur simultaneously.

Figure 8:
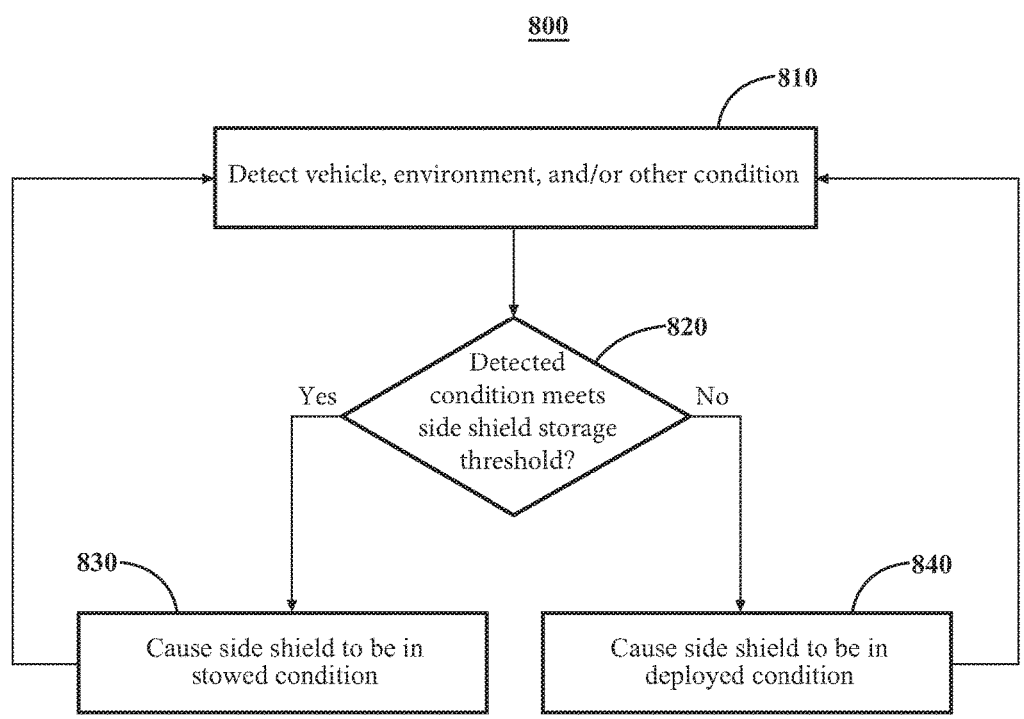
FIG. 8 is an example of an active side shield method.

Referring now to FIG. 8, an example of an active side shield method 800 is shown. At block 810, an environment condition, a vehicle condition, and/or one or more other conditions can be detected. The detecting of the environment condition, the vehicle condition, and/or the other condition(s) can be performed by one or more sensors of the sensor system 730 (e.g., one or more vehicle sensors 732 and/or one or more environment sensors 734). The detecting of the environment condition, the vehicle condition, and/or the other condition(s) can be performed continuously, periodically, irregularly, or randomly. The method 800 can continue to decision block 820.

At decision block 820, it can be determined whether the detected environment condition, the vehicle condition, and/or the other condition(s) meets a side shield stowage threshold. The side shield stowage threshold can be a predetermined threshold. The determination of whether the detected environment condition, the vehicle condition, and/or the other condition(s) meets a side shield stowage threshold can be performed by the side shield position module(s) 760 and/or the processor(s) 710. The determination of whether the detected environment condition, the vehicle condition, and/or the other condition(s) meets the side shield stowage threshold can be performed continuously, periodically, irregularly, or randomly. If the detected environment condition, the vehicle condition, and/or the other condition(s) meets the side shield stowage threshold, the method can continue to block 830. If the detected environment condition, the vehicle condition, and/or the other condition(s) do not meet the side shield stowage threshold, the method can continue to block 840.

At block 830, the side shield 300 can be caused to be moved into the stowed position. The side shield position module(s) 760 and/or the processor(s) 710 can send control signals to one or more components of the vehicle 100 to cause the side shield 300 to move into the stowed position. For instance, control signals can be sent to the actuator(s) 770, piston(s), motor(s), etc. to cause the side shield 300 to move into the stowed position. If the side shield 300 is already in the stowed position, then the side shield 300 can remain in such position.

At block 840, the side shield 300 can be caused to be moved into the deployed position. The side shield position module(s) 760 and/or the processor(s) 710 can send control signals to one or more components of the vehicle 100 to cause the side shield 300 to move into the deployed position. For instance, such control signals can be sent to the actuator(s) 770, piston(s), motor(s), etc. to cause the side shield 300 to move into the deployed position. If the side shield 300 is already in the deployed position, then the side shield 300 can remain in such position.

The method 800 can end. Alternatively, the method 800 can return to block 810 or some other block.

A non-limiting example of the operation of the vehicle 100 will now be described. In this example, the side shield stowage threshold can be based on vehicle speed. For purposes of this example, the side shield stowage threshold can be 45 miles per hour. The vehicle 100 can have side shields 300 associated with the transition region 118 between the cabin 114 and the deck 116 on both lateral sides of the vehicle 100.

The vehicle 100 can be traveling on a road. The speed of the vehicle 100 can be 35 miles per hour, as can be determined by one or more vehicle sensor(s) 732. The side shield position module(s) 760 and/or the processor(s) 710 can determine that the current speed of the vehicle 100 is below the side shield stowage threshold; therefore, the current speed of the vehicle 100 does not meet the side shield stowage threshold. Thus, the side shield 300 should be in the deployed position.

The side shield position module(s) 760 and/or the processor(s) 710 can send control signals to the actuator(s) 770 to cause the side shield 300 on one or both sides of the vehicle 100 to be moved, if necessary, into the deployed position. In such position, the change in shape in the transition region 118 between the cabin 114 and the deck 116 becomes less dramatic. As a result, turbulence or non-laminar airflow on the outside of the vehicle 100 at or near the transition region 118 can be reduced. The side shield 300 can be sufficiently long in the longitudinal direction 102 such that the air does not immediately dive into the open deck 116 after passing the cabin 114. As a result, aerodynamic performance benefits can be realized.

The speed of the vehicle 100 can continued to be monitored by the one or more vehicle sensor(s) 732. Eventually, the speed of the vehicle 100 may increase to 50 miles per hour. The side shield position module(s) 760 and/or the processor(s) 710 can determine that the current speed of the vehicle 100 is above the side shield stowage threshold; therefore, the current speed of the vehicle 100 meets the side shield stowage threshold. Thus, the side shield 300 should be in the stowed position.

The side shield position module(s) 760 and/or the processor(s) 710 can send control signals to the actuator(s) 770 to cause the side shield 300 on one or both sides of the vehicle 100 to be moved, if necessary, into the stowed position. In such position, the side shield 300 is not visible to an outside observer.

Such monitoring of the speed of the vehicle 100 can continue while the vehicle 100 is in operation. The side shields 300 can be caused to be moved to the stowed positon or to the deployed position based on the current speed of the vehicle 100. When the vehicle 100 reaches its destination, the transmission of the vehicle 100 can be placed in park. When the transmission gear selection of park is detected, the side shields 300 can be caused to be moved to the stowed position so as to be out of view.

It will be appreciated that arrangements described herein can provide numerous benefits, including one or more of the benefits mentioned herein. For example, arrangements described herein can improve the aerodynamic performance of a vehicle. When the side shield is in the deployed position, turbulence or non-laminar airflow on the outside of the vehicle at the cabin-deck interface can be reduced. Such improved vehicle aerodynamics can, in turn, improve vehicle fuel economy and/or overall vehicle efficiencies. Arrangements described herein can provide a smooth transitional shape between the cabin and the deck, thereby allowing for less air drag and providing a better coefficient of drag. When the side shield is in the stowed position, it is hidden from sight, thereby not detracting from the appearance of the vehicle. When in the deployed position, the side shield does not impede access the bed.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A method of actively managing aerodynamics of a pick-up truck, the pick-up truck including a cabin and a bed, a transition region being defined between the cabin and the bed in a region where the cabin transitions to the bed; the pick-up truck including a side shield, the side shield being movable between a stowed position and a deployed position, the side shield being located within a side wall of the bed when in the stowed position, and, when moving from the stowed position to the deployed position, the side shield extends at least partially out of the side wall in a direction toward the cabin when in the deployed position, the side wall including an aperture through which the side shield can be moved into and out of the stowed position and the deployed position, the method including:
receiving an input indicating a position for the side shield, the position being one of the stowed position or the deployed position; and
causing the side shield to be moved into or maintained in the position indicated in the input, whereby the aerodynamics of the pick-up truck at the transition region are actively managed by the side shield being in the stowed position or the deployed position.

2. The method of claim 1, further including:
detecting an environment condition of an external environment of the pick-up truck;
when the detected environment condition meets a side shield stowage threshold, causing the side shield to be moved into or maintained in the stowed position; and
when the detected environment condition does not meet the side shield stowage threshold, causing the side shield to be moved into or maintained in the deployed position, whereby the side shield creates a more gradual transition between the cabin and the bed.

3. The method of claim 2, wherein the detected environment condition is a current speed of the pick-up truck.

4. The method of claim 2, wherein the detected environment condition is an air speed in the external environment of the pick-up truck.

5. The method of claim 1, wherein the side shield is movable responsive to receiving an input from an occupant of the pick-up truck.

6. The method of claim 1, further including:
when it is detected that a transmission of the pick-up truck is in park or an engine of the pick-up truck is off, the position is the stowed position.

7. The method of claim 1, wherein causing the side shield to be moved into and out of the deployed position is performed using one or more actuators operatively connected to the side shield.

8. A system for actively managing aerodynamics of a pick-up truck, the system comprising:
a cabin;
a bed located proximate to the cabin, the bed including a side wall, a transition region being defined by the cabin and the bed in a region where the cabin transitions to the bed; and
a side shield, the side shield being located at least partially within the side wall of the bed, the side shield being movable between a stowed position and a deployed position, the side wall including an aperture through which the side shield can be moved into and out of the stowed position and the deployed position,
when in the stowed position, the side shield is located substantially entirely within the side wall, and
when moving from the stowed position to the deployed position, the side shield extends at least partially out of the side wall in a direction toward the cabin, whereby the aerodynamics of the pick-up truck at the transition region are actively managed by the side shield being in the stowed position or the deployed position.

9. The system of claim 8, further including a processor and an actuator, wherein the processor is operatively connected to the actuator, wherein the actuator is operatively connected to the side shield, wherein the processor is configured to cause the actuator to move the side shield based at least partially on whether a detected condition meets a side shield stowage threshold.

10. The system of claim 9, wherein the detected condition is a current speed of the pick-up truck.

11. The system of claim 9, wherein the detected condition is an air speed in an external environment of the pick-up truck.

12. The system of claim 9, wherein the detected condition is a transmission of the pick-up truck being in park or an engine of the pick-up truck being off, and wherein, when the transmission of the pick-up truck is in park or the engine of the pick-up truck is off, the position is the stowed position.

13. The system of claim 8, wherein the side shield is movable responsive to receiving an input from an occupant of the pick-up truck.

14. The system of claim 8, wherein the side shield includes a plurality of side shield body segments.

15. The system of claim 14, further including a cover for selectively closing the aperture when the side shield is in the stowed position.

16. The system of claim 15, wherein one of the plurality of side shield body segments is operatively connected to the cover.

17. The system of claim 16, wherein the plurality of side shield body segments are configured to successively engage each other when going from the stowed position to the deployed position.

* * * * *